United States Patent
Dietl

(10) Patent No.: US 8,493,017 B2
(45) Date of Patent: Jul. 23, 2013

(54) ELECTRICAL DRIVE WITH SWITCHABLE COIL SECTIONS

(75) Inventor: Lothar Dietl, Aalen (DE)

(73) Assignee: C. & E. Fein GmbH (DE)

( * ) Notice: Subject to any disclaimer, the term of this patent is extended or adjusted under 35 U.S.C. 154(b) by 69 days.

(21) Appl. No.: 13/224,692

(22) Filed: Sep. 2, 2011

(65) Prior Publication Data

US 2012/0056564 A1 Mar. 8, 2012

(30) Foreign Application Priority Data

Sep. 3, 2010 (DE) .......................... 10 2010 045 177

(51) Int. Cl.
*H02P 1/00* (2006.01)

(52) U.S. Cl.
USPC . 318/497; 318/519; 318/400.11; 318/400.15; 318/184; 310/210; 310/200; 310/179; 310/256; 310/186; 378/94; 388/933; 324/161; 324/166; 324/173; 324/175

(58) Field of Classification Search
USPC .................. 318/17, 502, 400.41, 497, 400.11, 318/501, 261, 381, 246, 362, 519, 273, 244, 318/245; 378/94; 388/933; 310/200, 156.05, 310/179, 50, 184, 216.074, 186, 214, 256; 324/161, 166, 173, 175
See application file for complete search history.

(56) References Cited

U.S. PATENT DOCUMENTS

| | | | | |
|---|---|---|---|---|
| 5,063,319 A | * | 11/1991 | Mason et al. | 310/210 |
| 2004/0021389 A1 | * | 2/2004 | Jeong et al. | 310/184 |
| 2010/0012545 A1 | * | 1/2010 | Bottoms | 206/493 |
| 2011/0012545 A1 | | 1/2011 | Aarestrup | |
| 2011/0057597 A1 | * | 3/2011 | Bosch et al. | 318/497 |

FOREIGN PATENT DOCUMENTS

| | | |
|---|---|---|
| DE | 19642665 A1 | 4/1998 |
| DE | 10339095 A1 | 3/2005 |
| DE | 102007040725 A1 | 3/2009 |
| EP | 2104221 A1 | 9/2009 |

* cited by examiner

*Primary Examiner* — Eduardo Colon Santana
*Assistant Examiner* — Jorge Carrasquillo
(74) *Attorney, Agent, or Firm* — St. Onge Steward Johnston & Reens LLC

(57) ABSTRACT

The invention relates to an electrical drive having a motor with a rotor and a stationary stator, which has a coil arrangement, and having a motor controller for controlling the motor, with the motor controller being configured to pass current through the coil arrangement in order to produce an excitation field, with the coil arrangement having a plurality of coil winding sections, and with each coil winding section having a plurality of coil sections, wherein the polarity of at least one coil section of the plurality of coil sections of each coil winding section can be selectively reversed with respect to the other coil sections of the coil winding section. The drive is particularly suitable for use for an electrical tool.

16 Claims, 5 Drawing Sheets

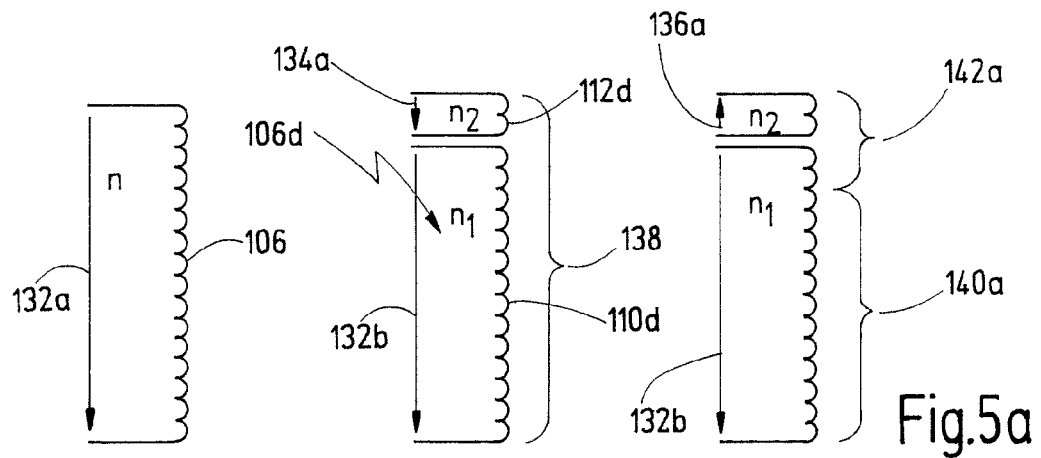
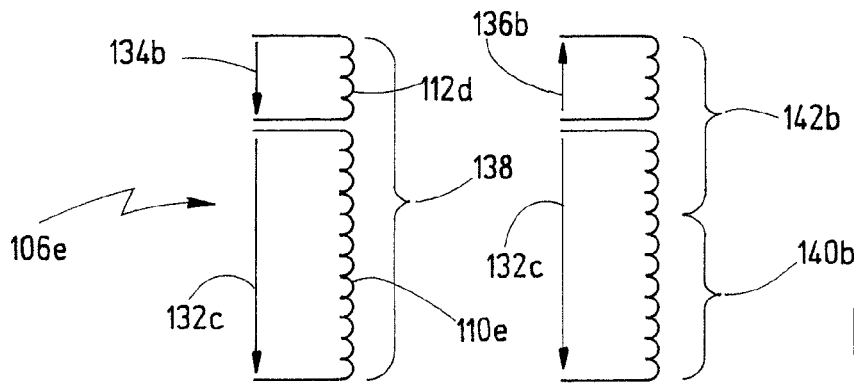
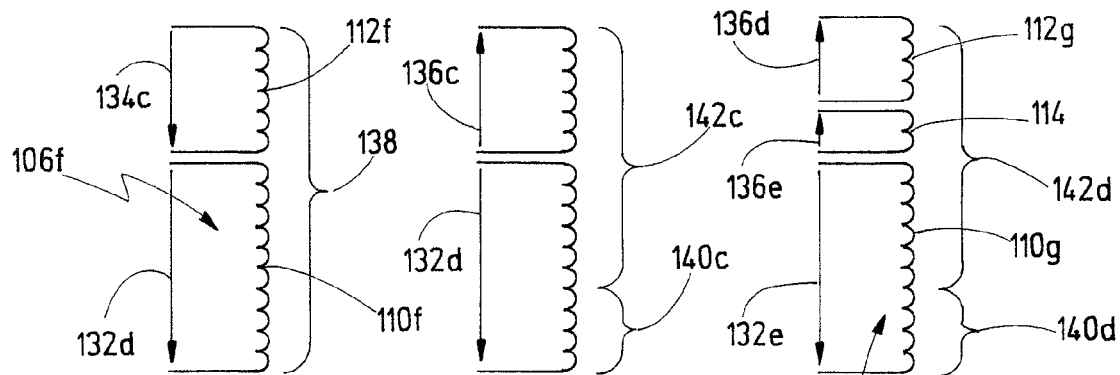
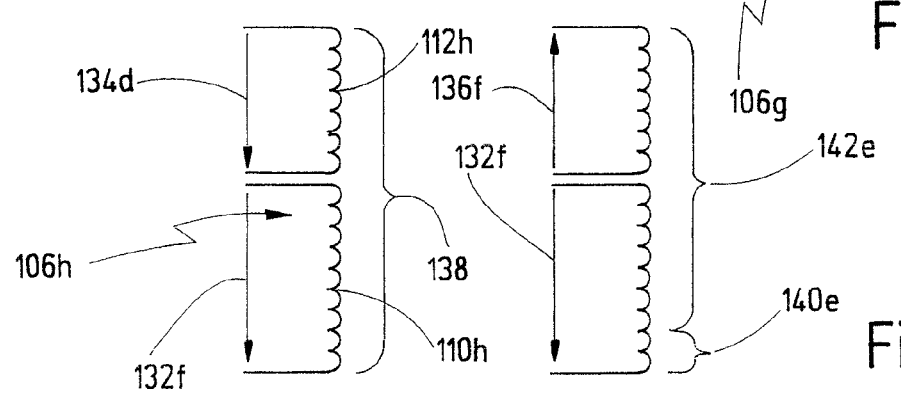

ELECTRICAL DRIVE WITH SWITCHABLE COIL SECTIONS

CROSS REFERENCES TO RELATED APPLICATIONS

This application claims priority from German patent application 10 2010 045 177, filed on Sep. 3, 2010. The entire content of this priority application is incorporated herein by reference.

BACKGROUND OF THE INVENTION

The invention relates to an electrical drive, in particular for an electrical tool having a motor with a rotor and a stationary stator, which has a coil arrangement, and having a motor controller for controlling the motor, with the motor controller being configured for passing current through the coil arrangement in order to produce an excitation field, with the coil arrangement having a plurality of coil winding sections, and with each coil winding section having a plurality of coil sections.

A drive such as this is known from DE 10 2007 040 725 A1.

The known drive is an electrical machine having a rotor with permanent magnet excitation and having a stator which is fitted with a polyphased winding and can be operated on the one hand in a relatively low rotation speed range, and on the other hand in a relatively high rotation speed range. For this purpose, provision is made to disconnect parts of the stator winding, or to switch between series connection and parallel connection.

In addition to normal operation, this is intended to allow so-called weak-field operation in a relatively high rotation speed range.

Different rotation speed ranges can therefore in principle be provided with one electrical machine. However, it has been found that, in this case, weak-field operation may involve increase thermal loading. Operating modes such as these can therefore frequently be used only temporarily, for example as so-called boost functions.

It is also known that the rotation speed level of an electrical drive, in particular of an EC motor, can be influenced by regulating the supply voltage. In this case, in principle, there may be a proportional relationship between the achievable operating rotation speed and the supply voltage.

SUMMARY OF THE INVENTION

In view of this, it is a first object of the invention to disclose an electrical drive which can be effectively matched to different operating conditions.

It is a second object of the invention to disclose an electrical drive which can be operated with little wear even if the speed/torque ratio is altered by switching.

It is a third object of the invention to disclose an electrical drive which can be switched between different speed/torque ratio even on continuous load.

It is a third object of the invention to disclose an electrical drive with little design complexity, and which, in particular, is suitable for use for driving an electrical power tool.

According to one aspect, these and other objects are solved by an electrical drive, comprising:
a motor having a rotor and a stationary stator;
a coil arrangement;
a motor controller for controlling said motor, said motor controller being configured for passing current through said coil arrangement for generating an excitation field;
at least one switch;
a plurality of coil winding sections arranged on said coil arrangement, each coil winding section having at least a first coil section and a second coil section, said first coil section having a first polarity, and said second coil section having a second polarity;
wherein said at least one switch is configured for selectively reversing at least one of said first and second coil sections with respect to another one of said first and second coil sections.

The object of the invention is achieved in this way.

Specifically, according to the invention, the drive can now be switched to at least two operating modes, in which the coil sections in a coil winding section may on the one hand have the same polarity and on the other hand may have opposite polarity to one another.

The excitation field, which is linked thereto, can therefore also have two states, in which the fields which are coupled to the coil sections on the one hand are additively superimposed, and on the other hand at least partially cancel one another out. In consequence, the torque is changed for the same conductor current, that is to say the torque constant. At the same time, the voltage induced by the rotating rotor in the coil sections is also changed. This can be either additive or subtractive, depending on the polarity of the coil sections. As a result, the rotation speed changes for the same winding section voltage, that is to say the rotation speed constant.

In this case, reversing the polarity of a coil section results in the north pole and south pole being interchanged, and at the same time in reversal of the direction of the magnetic field produced by this coil section.

According to one development of the invention, the motor controller is configured to operate the motor with a first rotation speed/torque characteristic and with a second rotation speed/torque characteristic, whose gradient is different from that of the first rotation speed/torque characteristic, with the power output preferably being substantially unchanged when the relative load is the same.

The relative load can in this case be regarded as the quotient of the rotation speed difference between the no-load rotation speed $n_0$ and the load rotation speed $n_L$ on the one hand, and the no-load rotation speed $n_0$ on the other hand, that is to say $(1-n_1/n_o)$, or alternatively as the quotient of the load torque $M_L$ and the holding torque $M_H$, (that is to say calculated from the characteristic gradient at saturation or at current limiting), that is to say, $M_L/M_H$.

This allows the drive behavior to have the functionality of a variable-speed gearbox. A gearbox-type relationship can be obtained in this case, for example a step-up factor, a step-down factor or spreading, between the rotation speeds or the torques of the first and second characteristic.

In other words, for example when changing from the first characteristic to the second characteristic, the rotation speed may increase by the factor by which the torque falls.

According to a further aspect of the invention, at least one polarity reversing switch is provided, which is configured for switching the plurality of coil sections of a coil winding section between a first state, in which all the coil sections in the coil winding section have the same polarity, and a second state, in which at least one coil section of the plurality of coil sections in the coil winding section has opposite polarity to the other coil sections in the coil winding section.

This measure has the advantage that the resultant copper losses or line losses remain virtually the same in the first state and in the second state.

The at least one polarity reversing switch may be in the form of a mechanical switch, an electromechanical switch or an electronic switch. For example, a mechanical switch can be coupled to a selection switch which can be operated by an operator, in order to selectively switch the drive from the first state to the second, and back.

By way of example, an electronic switch may comprise semiconductor switch elements and, in particular, may be coupled to the motor controller, in order to be activated by it. The drive can therefore be switched between the first state and the second state or vice versa on the basis of a signal produced in the motor controller, or on the basis of a signal supplied to it.

In one expedient refinement of the invention, at least one coil winding section has a first coil section and a second coil section, wherein the first coil section has a first number of turns ($n_1$), and the second coil section has a second number of turns ($n_2$), and wherein, when the motor controller causes current to flow, magnetic fields are produced which are coupled to the coil sections and produce a sum field when the first coil section and the second coil section have the same polarity, and which produce a difference field when the second coil section has an opposite polarity to the first coil section.

At the same time, the voltages inducted in the coil sections are added, as a result of which the induced voltage is reduced and the no-load rotation speed increased when the polarity of the second coil section is reversed. It is self-evident that the second number of turns ($n_2$) must be less than the first number of turns ($N_1$), without rotation direction reversal.

This makes it possible to provide the functionality of a two-speed gearbox.

When the first coil section and the second coil section have the same polarity, this results in a total number of turns (n) which is equal to the sum of the first number of turns ($n_1$) and the second number of turns ($n_2$). In consequence, the coil sections behave like a single coil with (n) turns.

However, when the polarity is reversed, the flux which is coupled to the second coil section opposes the flux produced in the first coil section. The magnetic fields and induced voltages linked thereto in consequence partially cancel one another out. An effective number of turns in consequence remains (n*), which corresponds to the difference between the first number of turns ($n_1$) and the second number of turns ($n_2$).

The factor (i) can be determined from the ratio of the effective number of turns (n*) and the total number of turns (n), and represents a measure of the rotation speed "step-up ratio" which can be produced by the respective configuration of the first coil section and of the second coil section.

The torque which results in this case can be indicated in the same manner (that is to say inversely proportional thereto).

With this type of field neutralization, both the output power P2 (when n becomes greater, M becomes less) and the resistive losses remain substantially unchanged for the same relative load, as a result of which the thermal design of the motor can take equal account of both states. The suitability for continuous operation is therefore considerably improved.

According to one development of this refinement, the polarity of the second coil section can be reversed, wherein the second coil section has a number of turns ($n_2$) which is less than the first number of turns ($n_1$).

This allows virtually any desired "step-up ratio" to be produced between the first state and the second state, depending on the practically feasible number of turns. In this case, on the one hand, it is possible to produce a step-up in the speed, for example when changing from the first state to the second state. The second state can, for example, likewise represent a basic state, from which the drive can be switched to the first state. For example, it would thus be possible to provide a short-term so-called boost state in addition to the basic state, which boost state is characterized by a torque increased by the step-up factor (i), at a reduced rotation speed.

According to one alternative development of the refinement, the polarity of the second coil section can be reversed, with the second coil section having a number of turns ($n_2$) which is greater than the first number of turns ($n_1$).

The rotation direction of the drive can thus be reversed without significantly increasing the design complexity. This makes it possible to provide a reverse gear.

It is particularly preferable to be able to reverse the polarity of either the first coil section, the second coil section, or else both coil sections with respect to an initial state in which the magnetic field which is produced is in a first direction in the first state, in which the polarity of all the coil sections of one coil winding section is the same.

This measure makes it possible to produce a total of four gear levels, specifically for example two forward gears and two reverse gears. It is self-evident that, in this case, the first coil section and the second coil section should have numbers of turns which differ from one another at least by a small amount.

According to a further refinement of the invention, the difference field and the induced back voltage is reduced substantially by a factor $$\left(i = \frac{n_1 + n_2}{n_1 + n_2}\right)$$

in comparison to the sum field.

This allows the desired "step-up ratio" to be produced easily by the configuration of the coil sections. Apart from polarity reversal, no further actions are required by the motor controller in this case to change the drive from the first state to the second state.

According to a further aspect of the invention, the motor is a motor which has permanent magnet excitation and can be commutated electronically.

Motors such as these, which are also referred to as EC motors, have various advantages such as low wear, high performance and dynamics. They are particularly suitable for applications in which a power supply can be provided by means of a DC voltage source.

Alternatively, motors which have permanent magnet excitation and can be commutated electronically can likewise be operated from an AC voltage power supply system, for example with the assistance of rectifiers.

In principle, EC motors have a rotating part with permanent magnet excitation, which may be in the form of an internal rotor, or an external rotor.

The part with permanent magnet excitation is associated with a stator which may have the exciter winding arrangement, that is to say the plurality of coil winding sections, as well as a laminated core, for example.

A drive such as this does not require brush contacts, as a result of which, apart from the wear to a motor bearing there is no need to expect any significant mechanical wear. The drive is accordingly particularly suitable for long-term applications.

By way of example, an EC motor may be provided with sinusoidal or block commutation via the motor controller. Pulse width modulation (PWM control) may be used in this case.

In particular, a pulse-width-modulated signal with a constant source voltage can on the one hand, when the exciter voltage is clocked in time, produce a voltage signal whose mean value is lower than the source voltage, and on the other hand can approximate to a specific voltage profile, for example a profile similar to a sinusoid.

In addition to the first state and the second state, which can be produced by deliberately reversing the polarity of the coil sections in the coil winding sections, it is therefore also possible to produce further operating states. For example, if the actual level of an exciter voltage is in this case below the output level of the source voltage, then an instantaneous rotation speed/torque characteristic of the motor can be shifted to higher rotation speeds.

This measure has the advantage that further states can be regulated and controlled particularly finely, in addition to the two "rigid" states which can be produced by polarity reversal.

In addition, it is preferable for two or more coil sections to be provided in each coil winding section, whose polarity can be reversed selectively.

This also allows finer graduation of the drive characteristic.

By way of example, if three coil sections are provided, the polarity of two coil sections of which can be reversed individually or jointly with respect to an initial state, than a total of at least four states can likewise be produced, depending on the number of turns provided ($n_1$, $n_2$, $n_3$), which four states correspond to four rotation speed/torque characteristics, which have mutually different gradients.

If, in this case, the polarity of the remaining third coil section can also be selectively reversed, then it is possible to produce a total of even more gear levels, possibly also with a rotation direction change.

Alternatively, instead of reversing the polarity of one coil section in a coil winding section, it is also feasible to switch from this coil section to a further coil section, a field weakening section, of the opposite polarity to this.

This also allows the drive to be operated in the first state and in the second state.

When using the drive for an electrical tool, in particular a handheld electrical tool, it is particularly preferable to be able to couple the electrical tool to a tool spindle, in order to drive a tool.

By way of example, the electrical tool may be a tool for screw driving, drilling, sawing, cutting, grinding or polishing.

Electrical tools such as these are used for widely different purposes, as a result of which it is frequently desirable to influence an output drive movement of a tool, for example by variation of the output drive torque or output drive rotation speed.

By way of example, variations such as these can be provided by mechanical gearboxes. These may have a plurality of gear levels, which can influence the output drive rotation speed or the output drive torque on the one hand, and, for example, a rotation direction as well, on the other hand. In this case, in the case of mechanical gearboxes, in particular in the case of gearboxes with gearwheels, every step-up step is in general associated with a constant step-up ratio (i).

According to the present invention, a characteristic such as this can also be produced directly in the drive, thus allowing a gearbox such as this to be replaced, or have an extended functionality added to it.

One particular advantage of the invention is that the switching process can take place under load. The mechanical drive train is in this case unchanged. The position of the switching point can be chosen freely. In contrast, when using a mechanical gearbox, switching must in general take place while stationary. Furthermore, a switching element must be moved mechanically.

An electrical tool which can be switched according to the invention can therefore be configured to be particularly lightweight and simple, while at the same covering a broad range of applications.

According to a further aspect of the invention, at least one polarity reversing switch is provided in the electrical tool and is coupled to the motor controller, in order to selectively reverse the polarity of the at least one coil section in the coil winding sections, depending on an operating state of the electrical tool.

In this case, the motor controller can be configured for detecting an operating state variable, or to evaluate an operating state variable supplied to it, in order to initiate the polarity reversal as a function of this.

If it is found that the rotation speed has fallen because of a high relative load, then, for example, the polarity of one coil section in a coil winding section which has the opposite polarity to the other coil sections in the coil winding section can be reversed in order to return to the first state, for example, in which a fundamental higher output drive torque can be produced.

In contrast, if it is found, for example, that the load is only relatively low, then, for example, the drive can be switched from the first state to the second state, by reversing the polarity of at least one coil section in the coil winding section with respect to the other coil sections. This makes it possible to produce a high speed, for example for a screwdriver.

The performance of the electrical tool can therefore be increased overall, and the electrical tool can be used more flexibly.

According to a further refinement of the invention, the at least one polarity reversing switch is coupled to a selection switch for selectively reversing the polarity of the at least one coil section of the coil winding sections.

In this case, the selection switch may be arranged at any desired point, for example on a housing of the electrical tool.

An operator who, for example, has become used to a mechanical gearbox can therefore manually select a desired "gear level". In this case, the characteristic of the drive in the first state, in the second state as well as the difference which can be detected after polarity reversal differ only insignificantly from the characteristic of a mechanical variable-speed gearbox.

If provision is made for the at least one polarity reversing switch to be in a mechanical or substantially electromechanical form, then this can be embodied directly by the selection switch (comparable, for example, to different switch positions of an ignition lock).

In contrast, if the at least one polarity reversing switch is intended to be in the form of an electrical or electronic switch, then the selection switch can be coupled to the motor controller, in order to control this.

According to a further aspect of the invention, a gearbox is provided for stepping down or stepping up an output drive torque or an output drive rotation speed, and a control device is provided, which is configured for detecting at least one characteristic variable which characterizes an operating state, with the control device preferably being associated with the motor controller, or being coupled to it.

In this case, the gearbox may have a constant step-up ratio, or else may be in the form of a variable-speed gearbox with a plurality of switch positions.

The drive can therefore provide a further graduation in addition to the step-up ratio produced by the gearbox, thus allowing the electrical tool to be matched to specific applications to an even greater extent.

According to a further refinement of the invention, the electrical tool has a power supply device for providing electrical power, which can preferably be coupled to a direct-current source, furthermore preferably to a rechargeable battery.

Particularly in the case of electrical tools which are independent of the mains, preferably portable electrical tools, it is therefore possible to vary the rotation speed/torque characteristic without any significant increase in weight, as a contribution to improving the performance of the electrical tool.

In the case of an electrical tool which has an electric motor which has permanent magnet excitation and can be commutated electronically, and whose motor controller is coupled to a direct-current source, the drive according to the invention can be produced in a particularly simple form with a very small number of additionally required components.

Overall, the invention provides a novel drive which is particularly suitable for an electrical tool and can simulate a "gearbox functionality" to a major extent. This is done with particularly little additional complexity, and in the process requires no significant additional physical space.

The gearbox functionality is simulated with high efficiency while furthermore avoiding drive states which potentially cause wear, in particular in terms of thermal loading.

In principle, a drive according to the invention may also be used as an electrical machine, for example for a generator application.

It is self-evident that the features above and those which are still to be explained in the following text can be used not only in the respectively stated combination but also in other combinations or on their own without departing from the scope of the present invention.

BRIEF DESCRIPTION OF THE DRAWINGS

Further features and advantages of the invention will become evident from the following description of a plurality of preferred exemplary embodiments and with reference to the drawings, in which:

FIG. 5 shows various examples of combinations of coil sections in a coil winding section for use, for example, for a drive as shown in FIG. 1.

DETAILED DESCRIPTION OF PREFERRED EMBODIMENTS

Figure 1:
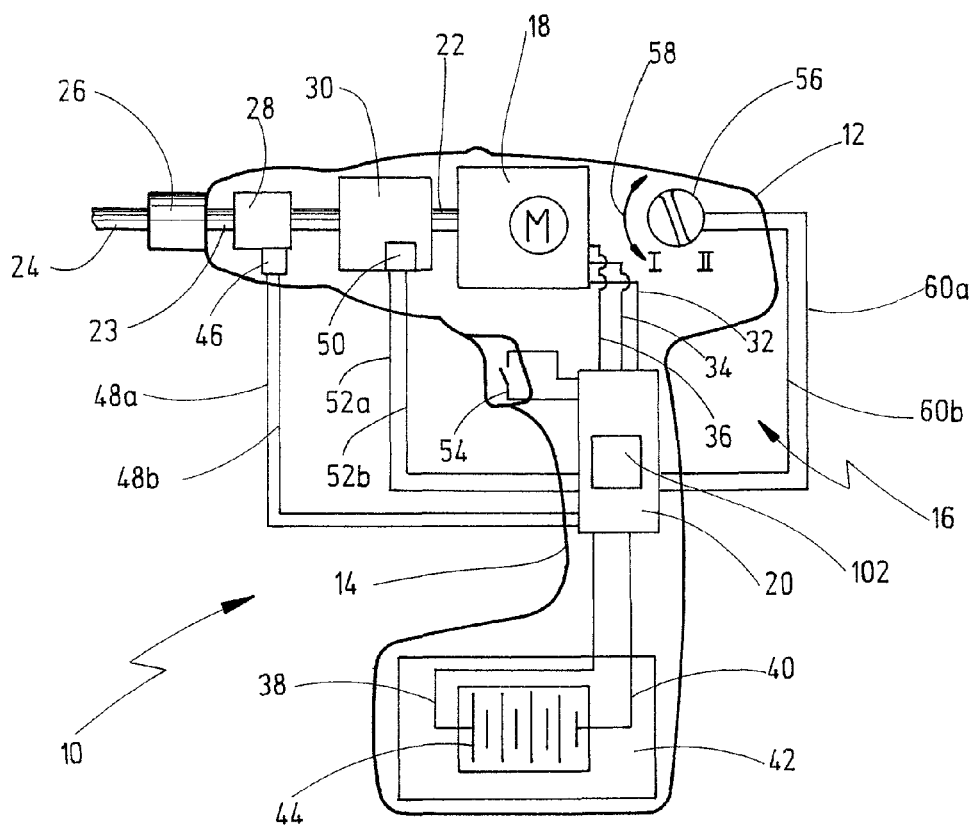
FIG. 1 shows a schematic view of an electrical tool with a drive according to the invention.

FIG. 1 shows a simplified schematic illustration of an electrical tool, which is annotated 10 overall.

By way of example, the electrical tool 10 is illustrated as a tool for drilling or screw driving. It is self-evident that, for example, it may also be a tool for hammer drilling and screw driving, sawing, hammering, cutting, grinding or polishing.

Depending on the purpose, the output drive movement may in this case be linear, rotational, intermittent or else oscillating. In the present case, the electrical tool 10 has a housing 12 which has a grip area 14, by means of which an operator can grip and operate the electrical tool 10.

A drive 16, which has a motor 18 and a motor controller 20, is provided in or on the housing 12. The motor 18 is used to drive a motor shaft 22, which is coupled to a tool spindle 23 which interacts with a tool 24 (illustrated slightly cutaway).

The tool 24 is fixed to the tool spindle 23 by a tool holder 26, for example a chuck.

A clutch 28 or a gearbox 30 may be arranged between the tool spindle 23 and the motor shaft 22. For example, the gearbox 30 may be in the form of a gearbox with gearwheels and may have a constant step-up ratio or else a plurality of switchable step-up steps. By way of example, the clutch 28 may be in the form of a slipping clutch or else a switched clutch, and may be used for overload protection or else can disconnect the tool spindle 23 from the motor shaft 22 for no-load functionality purposes. Furthermore, the clutch 28 may, for example, have a stop function, that is to say it can be fixed with respect to the housing 12, in order to allow a simple tool change or the like.

The motor 18 is preferably in the form of an electric motor which has permanent magnet excitation and can be commutated electronically, also referred to as an EC motor. In this case, the motor controller 20 can control the motor 18 in order to produce a rotating field. For this purpose, the motor controller 20 is coupled to the motor 18 via exciter lines 32, 34, 36.

Furthermore, the motor controller 20 can be coupled via supply lines 38, 40 to a power supply device 42 which, by way of example in FIG. 1, has a rechargeable battery 44.

The rechargeable battery 44 is in this case used as a direct-current source, the source voltage is converted by the motor controller 20 to an exciter voltage which is applied to the motor 18 via the exciter lines 32, 34, 36. In this case, each of the exciter lines 32, 34, 36 may, for example, be associated with one phase U, V, W.

Alternatively, the electrical tool 10 may also be connected to a stationary voltage source, for example to a mains power supply system. In this case, a rectifier arrangement can be provided in order to change an AC voltage to a DC voltage.

Furthermore, in FIG. 1, the motor controller 20 is coupled, for example, to sensors 46, 50, and in this case signals are transmitted via sensor lines 48a, 48b and 52a, 52b. The sensors 46, 50 may be configured for detecting an operating state variable in order to describe an operating state of the electrical tool 10, which operating state variable is passed to the motor controller 20 or to a control device 102, which is provided close to the motor controller 20 or is coupled to it (cf. FIG. 3).

The operating state variable to be detected may in this case in principle be a rotation speed or a torque, for example on the drive or on the output drive, a switching state of a switch, a temperature, for example of the gearbox 30 or of the rechargeable battery 44, or else a value which embodies a voltage which is present on the exciter lines 32, 34, 36, or a current flowing through them.

By way of example, the sensor 46 can be configured for detecting a switching state of the clutch 28. Alternatively, the sensor 46 could be designed, for example, to detect a temperature in the clutch 28, as a wear or load indicator.

The sensor 50 can likewise be provided, in order to detect a switching state, for example an instantaneously selected switch position, of the gearbox 31, or else a temperature which characterizes an instantaneous load.

Furthermore, an operating switch 54 is provided in the grip area 14 of the electrical tool 10, and the operator can use this to selectively activate or else deactivate the electrical tool 10. The operating switch 54 is likewise coupled to the motor controller 20.

Furthermore, a selection switch 56 is provided on the housing 12 of the electrical tool 10 and is coupled to the motor controller 20 via selection switch lines 60*a*, 60*b*. As is indicated by the arrow annotated 58, the selection switch 56 can be switched backwards and forwards between a first position and a second position. The operator can use the selection switch 56 to switch the drive 16 of the electrical tool 10 for example between a first state with a first rotation speed/torque characteristic and a second state with a second rotation speed/torque characteristic, cf. also FIG. 3.

The operation of the drive 16 according to the invention will be explained in more detail in the following text with reference to FIGS. 2 to 4.

Figure 3:
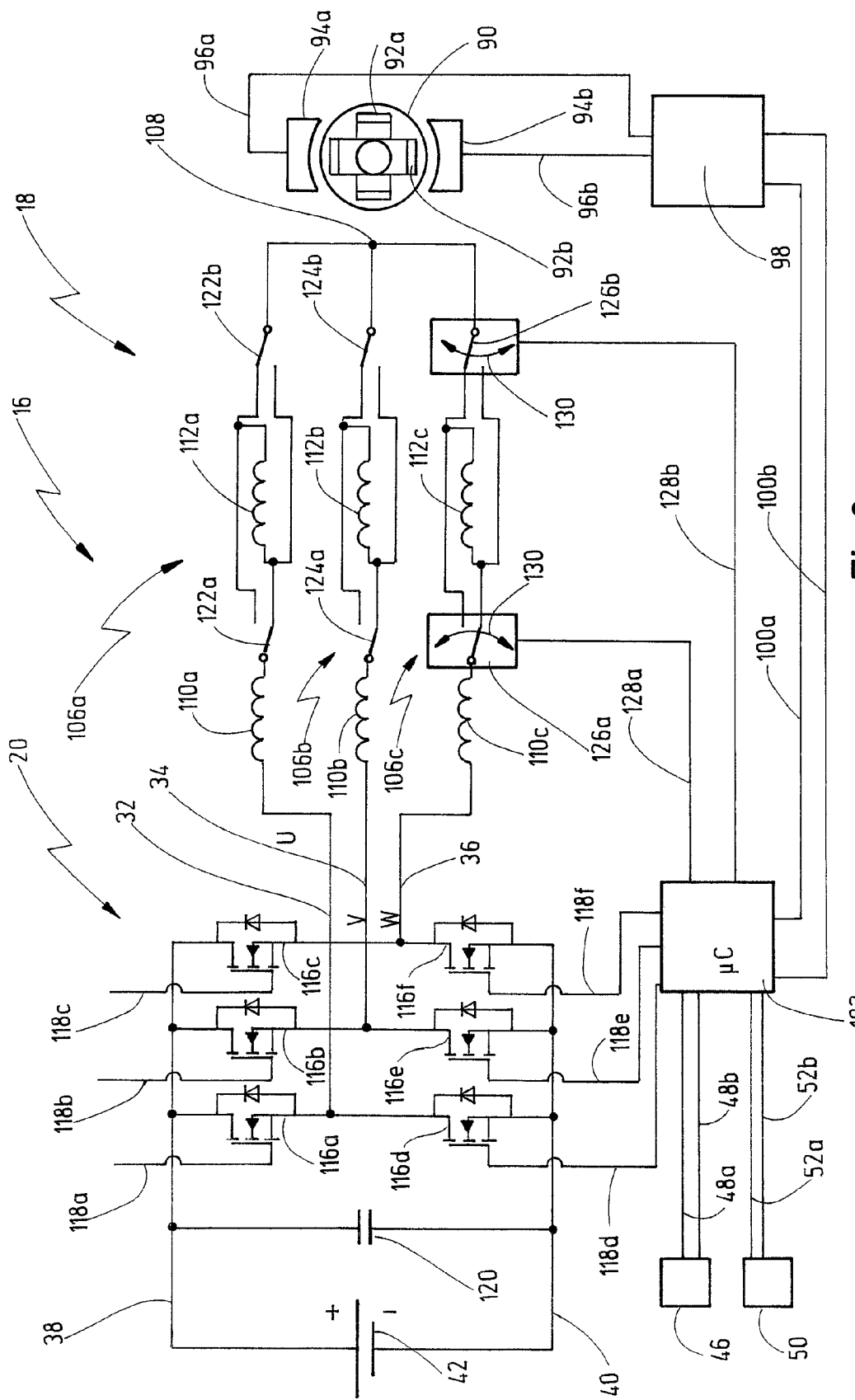
FIG. 3 shows a simplified schematic circuit diagram of the drive shown in FIG. 1 in the first state.
Figure 4:
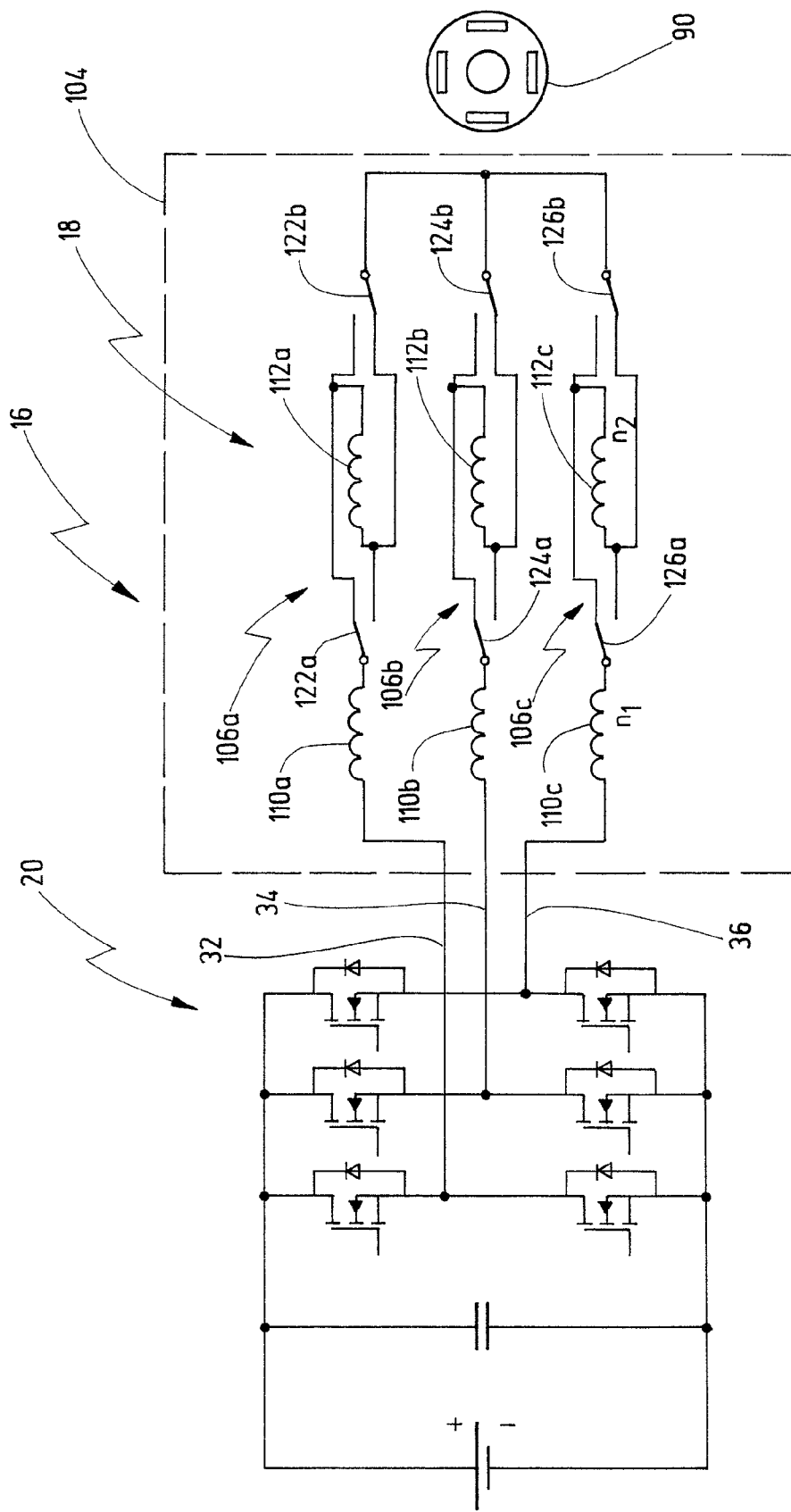
FIG. 4 shows a simplified schematic circuit diagram of the drive as shown in FIG. 1 in the second state.

FIGS. 3 and 4 show a simple schematic circuit diagram, by way of example, of a drive 16 for use for the electrical tool 10 as shown in FIG. 1.

Figure 2:
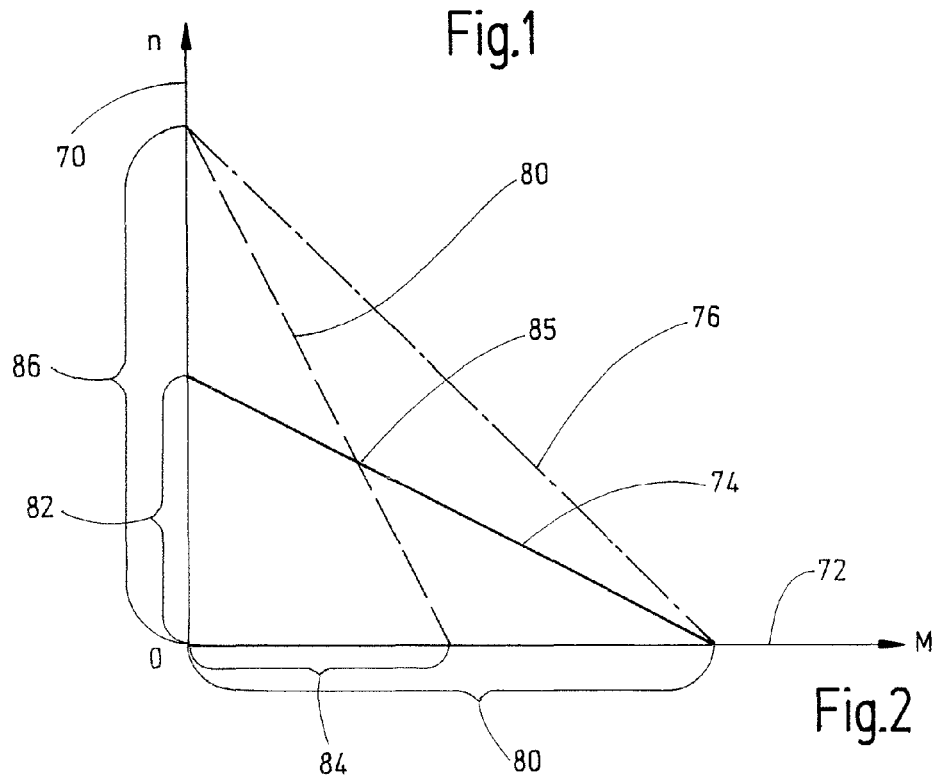
FIG. 2 shows idealized rotation speed/torque characteristics of various drives.

FIG. 2 shows examples of rotation speed/torque characteristics for an electric motor. In this case, the rotation speed n is plotted on the ordinate 70. Values for the torque M are shown, in contrast, on the abscissa 72.

Various rotation speed/torque profiles are plotted in an idealized form at 74, 76, 80. By way of example, the rotation speed/torque characteristic curve 74 represents an n(M) profile of a typical EC motor. The drive according to the invention can be operated both in a first state, for example with a rotation speed/torque characteristic curve 74, and in a second state, for example with a rotation speed/torque characteristic curve 80. This results in a functionality similar to that of a variable-speed gearbox.

In the first state, the characteristic curve 74 is characterized by a holding torque 80 and a no-load rotation speed 82. In contrast, the drive 16 can be operated in the second state as if a step-up gearbox were connected in between, with a step-up factor of i=2. The characteristic curve 80 which embodies the second state is characterized by a no-load rotation speed 86 and a holding torque 84. In this case, it is immediately evident that, in the chosen example, the no-load rotation speed 86 in the second state in the illustrated example is about twice the no-load rotation speed 82 in the first state. In contrast to this, the holding torque 84 in the second state is approximately half the holding torque 80 in the first state. Considered in an idealized form, the quotient of the holding torque 80 and the holding torque 84 is in this case inversely proportional to the quotient of the no-load rotation speed 82 and the no-load rotation speed 86.

The interception of the two characteristic curves 74, 80 is indicated by the number 85. If switching between the two characteristics takes place at this point, then the user is completely unaware of this. Starting from this point, it is then possible to continue to operate on either the characteristic curve 74 or 80.

For comparison, 76 indicates a further rotation speed/torque characteristic which, according to the prior art, for example according to DE 10 2007 040 725 A1, can be implemented on the basis of the first state, characterized by the characteristic curve 74.

In this case, the transition from the characteristic curve 74 to the characteristic curve 76 can be made, for example, by disconnection of coil elements. The resultant characteristic curve 76 cannot be derived in the same way as the characteristic curve 80, for example while maintaining the inverse proportionality between the respective quotients of the no-load rotation speed and the holding torque.

In this case, operation in accordance with the characteristic curve 76, for instance, can in principle lead to overloads in some areas of the drive. Conversely, if the drive 16 were to be designed for the characteristic curve 76, this would lead to increased design complexity, but the drive would in this case be considerably overdesigned for operation along the characteristic curve 74, for example.

Figure 2A:
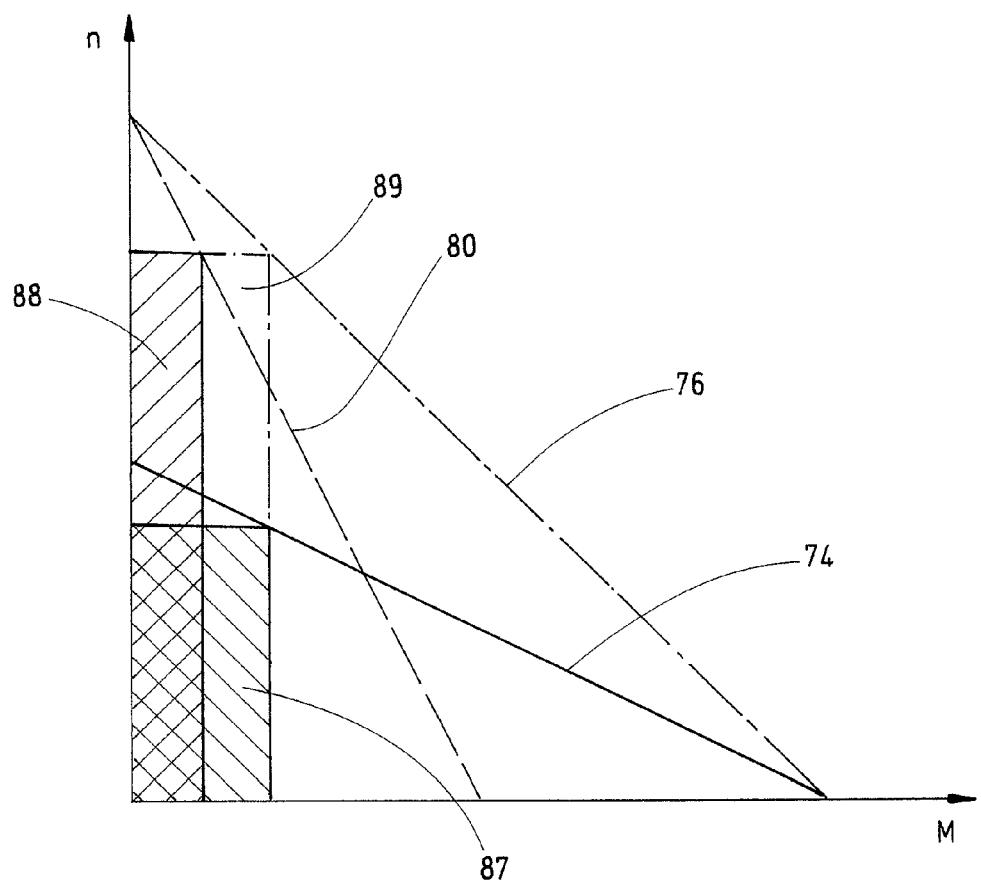
FIG. 2a shows a comparison of the rotation speed/torque characteristics as shown in FIG. 2 with respect to thermal loading.

This will be explained in more detail in the following text with reference to FIG. 2*a*. FIG. 2*a* shows the characteristic curves 74 and 80 as shown in FIG. 2 which, according to the invention, can be produced by switching and, for comparison, the characteristic curve 76 according to the prior art, which can be produced by disconnection of coil elements. The power which is emitted by way of example at a relative load of 80%, the product n×M, is represented by the first shaded area 87 for the characteristic curve 74. This corresponds to the output power at a relative load of 80% for the characteristic curve 80 which is obtained by switching according to the invention, cf. the second shaded area 88. Ignoring iron and friction losses, that is to say considering only copper losses (resistive losses), the amount of heat which is introduced into the motor by switching does not change in the case of the motor according to the invention, provided that the relative load remains the same.

In contrast, the characteristic curve 76 according to the prior art results in twice the power, cf. the area outlined by dashed-dotted lines. This is associated with doubling of thermal load, since the current rises to twice the value. In consequence, a motor which can be switched to a characteristic curve 76 for example by disconnection of coil elements according to the prior art would have to be designed for twice the thermal load, and this would be associated with a corresponding increase in weight and size. This clearly indicates that switching according to the prior art, as is known for example from DE 10 2007 040 725 A1, makes little sense.

A schematic illustration of a drive 16 according to the invention will be explained in the following text with reference to FIG. 3.

In this case, the drive 16 primarily has a motor part, the motor 18, as well as a control part, the motor controller 20.

The motor 18 has an associated rotor 90 which in the present case, by way of example, has two pole pairs 92*a*, 92*b*. It is self-evident that the rotor 90 may also, for example, have only one pole pair or else a plurality of pole pairs. The rotor 90 is provided with permanent magnet excitation, by means of appropriate magnetic materials.

In order to control the motor 16, it is necessary to detect a position or orientation of the rotor 90 relative to a stator 104 (indicated schematically in FIG. 4). This can be done, for example, by means of position sensors 94*a*, 94*b* which, for example, may be in the form of Hall sensors. In the present case, two position sensors 94*a*, 94*b* are illustrated, although in principle it is also possible to provide one position sensor 94 or a plurality of position sensors 94. The position sensors 94*a*, 94*b* are connected to a position detection device 98 via sensor lines 96*a*, 96*b*.

The position sensors 94*a*, 94*b* can be configured for detecting the magnetic field of the revolving rotor 90, or else of a sensor disc (not illustrated) which rotates together with the rotor 90, and to supply a signal for evaluation to the position detection device 98.

Alternatively, the position of the rotor 90 can also be detected without sensors, for example by detection and evaluation of a voltage induced in those coil winding sections of the stator 104 through which no current is flowing at that time.

The position detection device 98 is coupled via 100a, 100b to the control device 102, although it would likewise also be possible for this to be embodied together therewith, as part of the motor controller 20.

The control device 102 may comprise a processor or a logic unit, in order to control a plurality of coil winding sections 106a, 106b, 106c for producing an exciter field.

The coil winding sections 106a, 106b, 106c are associated with the stator 104, which may also, for example, have a laminated core (not illustrated).

In the present case, the coil winding sections 106a, 106b, 106c are connected to one another, for example via a star point 108. Alternatively, it is quite feasible to connect the coil winding sections 106a, 106b, 106c in delta.

According to the invention, the coil winding sections 106a, 106b, 106c have a plurality of coil sections 110a, 112a, 110b, 112b, 110c, 112c, the polarity of at least one coil section 112a, 112b, 112c of which can be reversed with respect to the other coil sections 110a, 110b, 110c.

It is self-evident that the illustration of the coil sections 110, 112 shown in FIGS. 3 and 4 is only symbolic. In particular, it can be assumed that the numbers of turns of the coils 110 differ from the numbers of turns of the coils 112.

The coil winding sections 106a, 106b, 106c can be controlled by the motor controller 20 via the exciter lines 32, 34, 36. The coil winding section 106a in this case embodies a phase U, the coil winding section 106b a Phase V, and the coil winding sections 106c a phase W.

It is self-evident that, in principle, the motor 18 may be controlled via an alternating field having more or fewer phases, rather than via a three-phase alternating field. In this case, it is also possible to provide more or fewer than three coil winding sections which, furthermore, may also be partially formed, for example, from parallel-connected partial winding sections.

The motor controller 20 furthermore has a number of switching elements 116a, 116b, 116c, 116d, 116e, 116f, which can be controlled by the control device 102 via switching lines 118a, 118b, 118c, 118d, 118e, 118f for changing the DC voltage, which is present at the power supply device 42, to an exciter rotating field.

In this case, the switching elements 116 may be in discrete or integrated form, as electronic switching elements. In this case, there may, for example, be transistors, in particular field-effect transistors. In this case, the transistors may have associated reverse-flow blocking diodes, in order to prevent a reverse flow or bypass flow.

Furthermore, the motor controller 20 may be associated with a damping element 120, for example a capacitance, for signal damping and signal smoothing.

By way of example, the polarity reversal of the second coil section 112c will be explained with reference to the phase W.

As shown in the illustration in FIG. 3, the coil winding section 106c, which can be controlled via the exciter line 36, has the first coil section 110c and the second coil section 112c. The coil sections 110c and 112c are oriented in the same sense, as a result of which a magnet field which is likewise oriented in the same sense is produced in both when they are operated, and these magnetic fields are added together to form a sum field. Polarity reversing switches 126a, 126b are provided in order to reverse the polarity of the second coil section 112c. As is indicated by the arrows annotated 130 these switches can be switched such that the second coil section 112c is in an orientation with reversed polarity in comparison to the first coil section 110c cf. in this context FIG. 4.

In this reversed polarity position, a second state, the magnetic fields which are produced on excitation in the coil sections 110c, 112c are opposite one another and cancel one another out, at least in terms of their magnitudes. The remaining weakened field can now contribute to providing the drive 16 with a characteristic which characterizes the second state, for example as indicated by the characteristic curve 80 in FIG. 2.

By way of example, the polarity reversing switch 126a is coupled to the control device 102 via a control line 128a, and the polarity reversing switch 126b is coupled to the control device 102 via a control line 128b, in order to be controlled selectively by this control device 102. The control device 102 can selectively change the drive 16 from the first state to the second state, for example after evaluation of signals produced by the sensors 46, 50.

Polarity reversing switches 122a, 122b, 124a, 124b are likewise provided in the other coil winding sections 106a, 106b although their connection to the control device 102 is not illustrated, for clarity reasons.

After the drive 16 has been changed from the first state, for example as shown in FIG. 3, to the second state, for example as shown in FIG. 4, this results in a characteristic which is approximately comparable to a drive which is coupled to a conventional gearbox in which the gear level has been changed.

Since the polarity reversal of the coil sections 112a, 112b, 112c, in the coil winding sections 106a, 106b, 106c takes place completely or virtually completely free of mechanical actions, for example in comparison to a gear change in a mechanical gearbox, this process can also be carried out during operation, for example when the rotor 90 is rotating. Polarity reversal can likewise also be carried out at rest, and in this case it is possible to avoid the disadvantages to which mechanical variable-speed gearboxes, in particular, are subject, such as tooth-to-tooth positions which prevent engagement when changing gear.

Various possible configurations of coil winding sections and states which result during polarity reversal will be explained with reference to FIGS. 5a to 5d.

FIGS. 5a to 5d show coil winding sections 106 which, by way of example, each have a total of sixteen turns n. It is self-evident that other numbers of turns, both higher and lower numbers of turns, may be used without any problems in practice. All that need be complied with is a minimum number of turns of at least three in the first coil section ($n_1$), when no rotation direction reversal is desired.

FIG. 5a shows a coil winding section 106 in a basic state, consisting of only one coil section. The coil winding section 106 in this case has a pole orientation as indicated by an arrow annotated 132a.

In contrast, a further coil winding section 106d has a first coil section 110d and a second coil section 112d. By way of example, the first coil section 110d in this case comprises fourteen turns, $n_1=14$, and the second coil section 112d two turns, $n_2=2$. In this case, two rectified pole orientations 132b, 134a are present in the first state. When coil winding section 106d is operated, this results in a sum field as indicated by 138. The magnitude of the sum field 138 in this case corresponds to the magnetic field produced in the coil winding section 106.

In contrast, in the second state, the second coil section 112d has an opposite pole orientation 136a. The pole orientation of the first coil section 132b is in this case unchanged. In this case, the magnetic field produced in the second coil section 112d is opposite the magnetic field produced in the first coil section 110d. This results in a difference field 140a, while in contrast a portion of the original sum field 138 is cancelled out by a field increase 142a. The effective number of turns is twelve, $n^* = n_1 - n_2 = 12$.

Overall, this makes it possible to produce a field weakening or "step-up ratio" of $i=1.33$.

FIG. 5b shows a coil winding section 106e, in which a first coil section 110e now has twelve turns, $n_1=12$, and a second coil section 112d has four turns, $n_2=4$. In the first state, when the first coil section 110e and the second coil section 112d have pole orientations 132c, 134d in the same sense, this results in a sum field 138 which is unchanged from FIG. 5a. In contrast, in the second state, an opposite pole orientation 136b of the second coil section 112d results in considerable weakening of the sum field 138, thus resulting in a difference field 140b, whose magnitude is approximately half as great as that of the sum field 138. A field increase 142b is correspondingly present, which is approximately equal to the difference field 140b. Overall, this can result in a field weakening or "step-up ratio" of $i=2$.

First of all, FIG. 4 analogously shows a coil winding section 106f, in which the first coil section 110f now has ten turns, $n_2=10$, and the second coil section 112f has six turns, $n_2=6$. This results in a known manner in a difference field 140c, which is now considerably reduced. The magnitude of the resultant field increase 142c is correspondingly increased to $i=4$.

Alternatively, FIG. 5c indicates how a state such as this can also be produced by means of a coil winding section 106g which, in addition to a first coil section 110g, has a second coil section 112g and a third coil section 114. The first coil section 110g has a pole orientation 132e. The coil sections 112g and 114 have pole orientations 136d, 136e which are opposite to this and in the end lead to a field weakening corresponding to the pole orientation 136c. The resultant difference field 140d corresponds to the difference field 140c.

This directly means that other forms of field weakening can be produced for example by selective polarity reversal of only the second coil section 112g or else of the third coil section 114. This makes it possible to provide further operating states for the drive 16.

Finally, FIG. 5d shows a coil winding section 106h in which a first coil section 110h has nine turns, $n_1=9$, and a second coil section 112h has seven turns, $n_2=7$. Accordingly, when the polarity of the second coil section 112h is reversed, this results in a considerably reduced remaining difference field 140e. In this example, the field weakening or "step-up ratio" is increased to $i=8$.

It is self-evident that a movement reversal can be achieved by further reducing the number of turns in the first coil section and/or by further increasing the number of turns in the second coil section, provided that the number of turns in the second coil section is greater than the number of turns in the first coil section.

Within the scope of the invention, a drive is provided which is particularly suitable for an electrical tool, allows an effective change to the operating characteristic of the drive with little design complexity and simple design, and which, in particular, can provide a functionality similar to that of a variable-speed gearbox. A plurality of operating states can be provided in this case, in which substantially comparable thermal loads occur in the drive, in particular without any thermal peak loads.

What is claimed is:

1. An electrical drive, comprising:
a motor having a rotor and a stationary stator;
a coil arrangement provided on said stator;
a motor controller for controlling the motor, said motor controller being configured for passing current through said coil arrangement for generating an excitation field;
a plurality of coil winding sections arranged on said coil arrangement, each coil winding section having at least a first coil section and a second coil section, said first coil section having a first polarity, and said second coil section having a second polarity; and
at least one polarity reversing switch for switching said plurality of coil sections of a coil winding section between a first state, in which all coil sections in said coil winding section have the same polarity, and a second state in which at least one of said coil sections of said plurality of coil sections has a polarity opposite a polarity of the remaining coil sections in said coil winding section;
wherein said motor controller is configured to operate said motor with a first rotation speed/torque characteristic having a first gradient and with a second rotation speed/torque characteristic having a second gradient being different from said first gradient,
wherein at least one coil winding section further comprises a first coil section and at least one second coil section, said first coil section having a first number of turns, and said second coil section having a second number of turns,
wherein said first and second coil sections are magnetically coupled for producing a magnetic sum field when said first and second coil sections have the same polarity, and for producing a magnetic difference field when said first and second coil sections have an opposite polarity, and
wherein said difference field is weaker than said sum field as well as associated induced voltages, substantially by a factor which is equal to a sum of the first and second numbers of turns divided the difference between the first and second numbers of turns ($i=n_1+n_2/n_1-n_2$).

2. The drive of claim 1, wherein a power output of said motor remains substantially unchanged upon switching between said first rotation speed/torque characteristic and said second rotation speed/torque characteristic when a relative load of said motor remains unchanged.

3. The drive of claim 1, wherein said polarity reversing switch is configured for reversing polarity of said second coil section, and said second coil section has a second number of turns which is less than said first number of turns.

4. The drive of claim 1, wherein said polarity reversing switch is configured for reversing polarity of said second coil section, wherein said second coil section has a second number of turns which is greater than said first number of turns.

5. The drive of claim 1, wherein said motor is configured as a motor having permanent magnet excitation and being electronically commutated.

6. An electrical drive, comprising:
a motor having a rotor and a stationary stator;
a coil arrangement;
a motor controller for controlling said motor, said motor controller being configured for passing current through said coil arrangement for generating an excitation field;
at least one switch;
a plurality of coil winding sections arranged on said coil arrangement, each coil winding section having at least a first coil section and a second coil section, said first coil section having a first polarity, and said second coil section having a second polarity;

wherein said at least one switch is configured for selectively reversing at least one of said first and second coil sections with respect to another one of said first and second coil sections, wherein said first coil section has a first number of turns, and said second coil section has a second number of turns, wherein said first and second coil sections are magnetically coupled for producing a magnetic sum field when said first and second coil sections have the same polarity, and for producing a magnetic difference field when said first and second coil sections have an opposite polarity, and wherein said difference field is weaker than said sum field as well as associated induced voltages, substantially by a factor which is equal to a sum of the first and second numbers of turns divided the difference between the first and second numbers of turns ($i = n_1 + n_2 / n_1 - n_2$).

7. The drive of claim 6, wherein said switch is configured for reversing polarity of said at least one of said first and second coil sections with respect to polarity of said another one of said first and second coil sections when said at least one of said first and second coil sections is selectively reversed.

8. The drive of claim 6, wherein said motor controller is configured to operate said motor with a first rotation speed/torque characteristic having a first gradient and with a second rotation speed/torque characteristic having a second gradient being different from said first gradient.

9. The drive of claim 6, wherein a power output of said motor remains substantially unchanged upon switching between said first rotation speed/torque characteristic and said second rotation speed/torque characteristic when a relative load of said motor remains unchanged.

10. The drive of claim 6, wherein said switch in configured as a polarity reversing switch for switching said plurality of coil sections of a coil winding section between a first state, in which all coil sections in said coil winding section have the same polarity, and a second state in which at least one of said coil sections of said plurality of coil sections in said coil winding section has a polarity opposite a polarity of the remaining coil sections in said coil winding section.

11. The drive of claim 6, wherein said polarity reversing switch is configured for reversing polarity of said second coil section, and said second coil section has a second number of turns which is less than said first number of turns.

12. The drive of claim 11, wherein said polarity reversing switch is configured for reversing polarity of said second coil section, wherein said second coil section has a second number of turns which is greater than said first number of turns.

13. The drive of claim 6, wherein said motor is configured as a motor having permanent magnet excitation and being electronically commutated.

14. An electrical power tool, comprising a tool spindle configured for driving a tool, and further comprising an electrical drive for driving said tool spindle, said electrical drive comprising:

a motor having a rotor and a stationary stator;

a coil arrangement provided on said stator;

a motor controller for controlling the motor, said motor controller being configured for passing current through said coil arrangement for generating an excitation field;

at least one switch; and a plurality of coil winding sections provided on said coil arrangement, each coil winding section having at least a first coil section and a second coil section, said first coil section having a first polarity, and said second coil section having a second polarity;

wherein said at least one switch is configured for selectively reversing at least one of said first and second coil sections with respect to another one of said first and second coil sections for reversing one of said first and second polarities with respect to another one of said first and second polarities, wherein said first coil section has a first number of turns, and said second coil section has a second number of turns, wherein said first and second coil sections are magnetically coupled for producing a magnetic sum field when said first and second coil sections have the same polarity, and for producing a magnetic difference field when said first and second coil sections have an opposite polarity, and wherein said difference field is weaker than said sum field as well as associated induced voltages, substantially by a factor which is equal to a sum of the first and second numbers of turns divided the difference between the first and second numbers of turns ($i = n_1 + n_2 / n_1 - n_2$).

15. The electrical power tool of claim 14, wherein said at least one switch is configured as a polarity reversing switch being coupled to said motor controller for selectively reversing polarity of at least one coil section in said coil winding sections, depending on an operating state of said electrical tool.

16. The electrical power tool of claim 14, further comprising a gearbox for stepping down or stepping up an output drive torque or an output drive rotation speed, and further comprising a control device being configured for detecting at least one characteristic variable being indicative of an operating state and being used for controlling said electrical power tool.

* * * * *